United States Patent [19]

Marks et al.

[11] 4,372,656

[45] Feb. 8, 1983

[54] HIGH EFFICIENCY OPTICAL PROJECTOR FOR 3D MOTION PICTURES

[76] Inventors: Alvin M. Marks, 166-35 9th Ave.; Mortimer Marks, 166-25 Cryders La., both of Whitestone, N.Y. 11357

[21] Appl. No.: 264,055

[22] Filed: May 15, 1981

[51] Int. Cl.³ .............................................. G03B 35/00
[52] U.S. Cl. ..................................... 352/57; 352/198; 362/19
[58] Field of Search .......................... 352/198, 203, 57; 362/16, 19

[56] References Cited

U.S. PATENT DOCUMENTS

| | | | |
|---|---|---|---|
| 1,709,017 | 4/1929 | Hill | 352/198 |
| 3,241,440 | 3/1966 | Kugler | 352/198 |
| 3,267,802 | 8/1966 | Noble | 352/198 |
| 3,302,517 | 2/1967 | Henkel | 352/198 |
| 3,720,460 | 3/1973 | Wilkinson | 352/198 |
| 3,808,422 | 4/1974 | Handtmann et al. | 362/19 |
| 3,876,285 | 4/1975 | Schwarzmuller | 362/19 |
| 3,912,920 | 10/1975 | Kubota | 362/19 |

FOREIGN PATENT DOCUMENTS

| | | | |
|---|---|---|---|
| 702423 | 4/1931 | France | 362/19 |
| 1285543 | 1/1962 | France | 352/203 |
| 880374 | 10/1961 | United Kingdom | 362/19 |

*Primary Examiner*—Monroe H. Hayes
*Attorney, Agent, or Firm*—Anthony H. Handal; Michael N. Meller

[57] ABSTRACT

This invention provides a high efficiency polarized light source and system for the projection of 3D motion pictures adaptable to a standard motion picture projector device. The projected light beam is compressed into a shape more nearly approximating the aperture shape so that substantially less than 40% of the light is lost at the gate.

9 Claims, 5 Drawing Figures

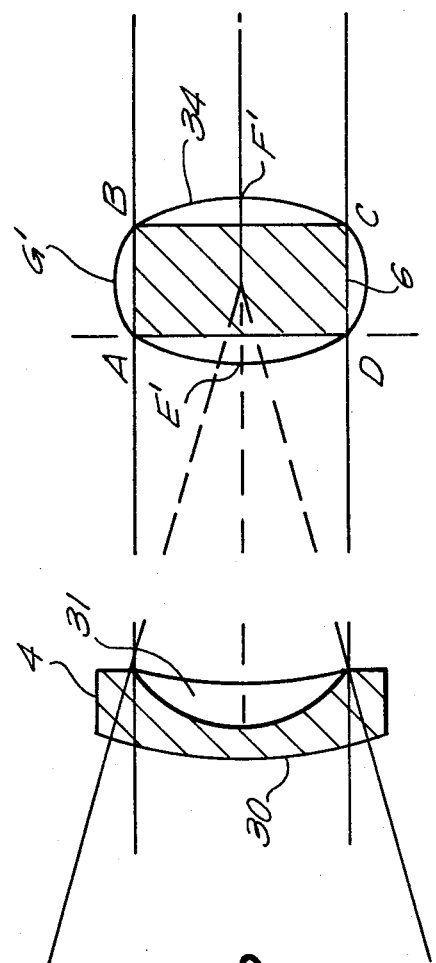
FIG. 2
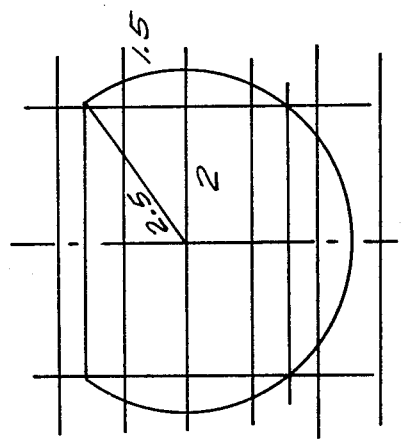
FIG. 3
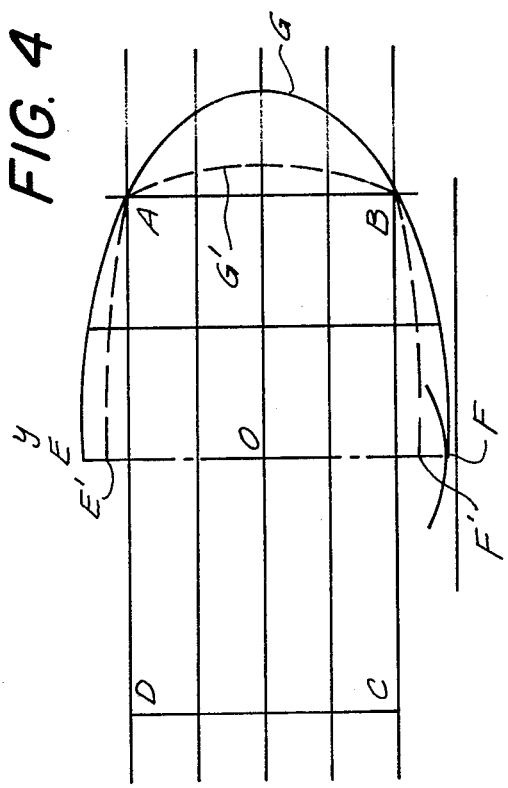
FIG. 4
FIG. 5

HIGH EFFICIENCY OPTICAL PROJECTOR FOR 3D MOTION PICTURES

BACKGROUND OF THE INVENTION

In the present state of the art a conventional motion picture projector utilizes a standard lamp housing and projects a light beam having a circular cross section onto the film gate of the projector. The conventional projector is converted to a 3D projector utilizing our POLARATOR TM attachment (U.S. Pat. No. 3,851,955, "Apparatus for Converting Motion Picture Projectors for Stereo Display", Dec. 3, 1974) to the standard projection lens. The POLARATOR TM contains polarizing elements which absorb from 60-65% of the incident light. More light is lost at the gate because the aperture plate is rectangular and the beam cross section is circular and light spills over the edge of the aperture, about 40% being wasted. Accordingly, it is an object of this invention to provide an efficient means for polarizing the light and means for conserving the light entering the gate.

FIG. 2 illustrates a negative aspheric lens for minimizing light loss at the film gate.

FIG. 3 illustrates an oval shaped cross section of a light beam at the film gate.

FIG. 4 shows an elliptical beam on a rectangular film gate aperture and an oval shaped beam to minimize light loss; and FIG. 5 shows a standard film gate aperture inscribed within a circular light beam which has considerable light loss.

IN THE FIGURES

Figure 1:
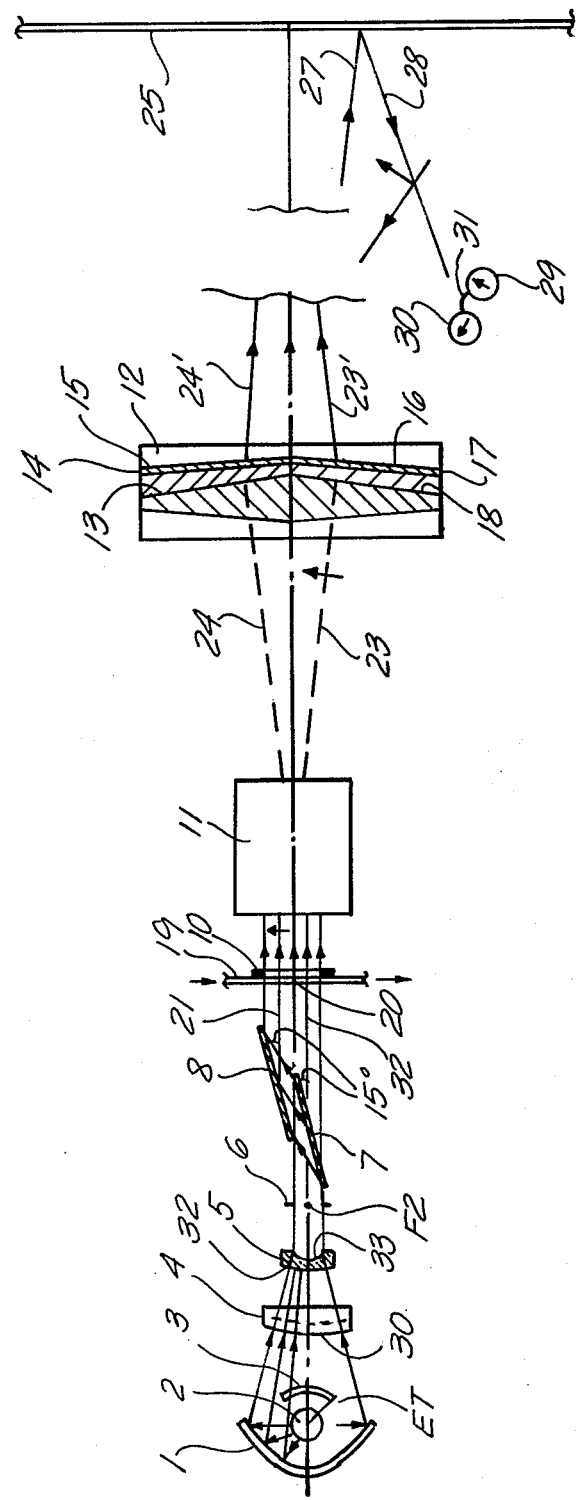
FIG. 1 is a diagrammatic cross sectional illustration of an optical system in accordance with the present invention.

FIG. 1 shows a complete system for accomplishing these objectives. In the Figure, $F_1$ and $F_2$ are the two focii of a reflector 1 comprising an ellipse of revolution. Light from source 2 proceeds from $F_1$, is reflected at the reflector 1 and converges on the second focus $F_2$. A spherical reflector 3 redirects light emitted forwardly by the source 2 back into the reflector 1. The beam is redirected by lenses 4 and 5 which have spherical surfaces 30 and 32, respectively, having their centers at the focus $F_2$. The surfaces 31 and 33 and the lenses 4 and 5 respectively are aspheric. Surface 31 has a spherical shape in the section shown in FIG. 1 and an elliptical shape in the section shown in FIG. 2. The effect of this aspheric surface is to redirect the beam as shown in FIG. 3 so that it forms the parallel lines AB and DC, respectively. The aspheric surface 33 is an elliptical cylinder as shown as an ellipse in FIG. 1. The effect of this shape is to redirect the beam converging to the focus $F_2$ onto the parallel beam shown in FIG. 1. An aperture plate 6 defines an approximately 2.1 or 2.3 ratio for the illumination of the image to form a wide screen aspect ratio. The parallel beam passes from the aperture 6 onto a glass plate 7 coated on each surface with titanium dioxide coatings. The plate 7 makes a Brewster's angle of about 15° with the beam axis. A portion of the beam is transmitted and a second portion of the beam is reflected toward the first surface mirror plate 8 which redirects the beam 21 parallel to the initially projected beam 22. Both beams are substantially polarized by transmission and reflection through the polarizing multilayer polarizing plate 7 so that the beam 21 is polarized in a vertrical plane and the beam 22 is polarized in a horizontal plane. About 90% of the beam energy is polarized to about 95% of polarization. However, for 3D motion pictures, about 99.9% of the beam must be polarized. It is therefore necessary to interpose the additional polarizers 14 and 17 on the prisms 13 and 18, respectively.

The beams 21 and 22 pass through the film 9, and are intercepted by the film gate 10 and the black bar 20 on the film 9. The image is projected by the lens 11 as the diverging beams 23 and 24 which are substantially, but not completely polarized in the direction shown in FIG. 1. After passing through the polarizers 14 and 17, respectively, the beams 23 and 24 became the almost completely polarized beams 23' and 24'. These beams eventually combine to form a ray 27 which is reflected from a metallized screen 25 as the beam 28 which contains both the right and left picture information. The right and left pictures are finally sorted and separated by the polarized viewer 31 which has a vertical polarized filter 29 for transmitting the right eye image and a horizontal polarized filter 30 for transmitting the left eye image.

FIG. 4 shows an elliptical beam EGF impressed on a rectangular aperture ABCD having a 2:1 aspect ratio. The ratio of the area of the ellipse to the area of the rectangle is 1.57.

FIG. 5 shows an area 4×3 which is for a standard gate, inscribed within a circle. The ratio of the circular area to the area of the rectangle is 1.63.

Comparing FIGS. 4 and 5, it is seen that there is a small difference between these ratios. However, if the ellipse in FIG. 4 is distorted to form the non-elliptical optimum oval E'G'F' indicated by the dashed line, the ratio can be decreased to about 1.2, there being an increase in the available light of 33%. This may be accomplished by modifying the aspherical surfaces in lenses 4 and 5 to cause the ellipse to be distorted into the optimum oval shown in FIG. 4, thus conserving the available light. Alternatively, as the light conserving means, a converging light pipe (not shown) may be employed in lieu of the distorted ellipsoid of revolution.

The titanium dioxide multilayer polarizer polarizes light with almost no loss in light energy. The light polarizers 14 and 17 transmit the pre-polarized light to the extent of approximately 70-80% of the input energy, compared with 35-40% which would have been the transmission without the interposition of the multilayer polarizer. Moreover, since the beams 23 and 24 are substantially pre-polarized, the high transmission polarizers 14 and 17 may be used to produce the 99.9% polarization required in the beams 23' and 24'.

In combination, the high efficiency polarizing system and the light conservation means as described above may be employed to effect an increase in light output by $2 \times 1.3 = 2.6$ times.

It will be understood that the inventions hereinabove described also have application to a projection 3D-TV system.

Having thus fully described my invention, what I wish to claim is:

1. A motion picture projection system, comprising a light source, a first reflector, a surface on said first reflector, said surface being an ellipse of revolution with a first focus and a second focus, said focii being coincident with said axis of revolution, a light source located at said first focus, a first lens, said first lens having a first spherical surface with its center of curvature at said second focus, and a first aspheric surface; said second lens having a second spherical surface with its center of curvature also at said second focus, and a second aspheric surface, a first rectangular aperture plate, a multilayer sheet polarizer at Brewster's angle to said axis, at least one surface having a high index layer capable of polarizing light by reflection and transmission, said reflected polarized light rays and said transmitted polarized light rays being polarized with their planes of polarization at right angles, a second reflector, said second reflector redirecting said reflected polarized light rays parallel and contiguous to said transmitted polarized light rays, a conventional film strip having a succession of image areas, a standard second aperture for said images, each said image area having a black bar centered in said image area, right and left stereo images in areas on each side of said black bar within said second aperture, said transmitted polarized rays impinging on one of said stereo image areas, and said reflected polarized rays impinging on the other said stereo image area, a projection lens, a first prism and a second prism, a first polarizer and a second polarizer, said first polarizer and said first prism in combination, and said second polarizer and said second prism in combination, said combined polarizer-prisms bending and further polarizing said rays, a metallized reflecting screen for reflecting said stereo images as polarized rays reflecting the image rays from said screen, a polarized viewer comprising a frame, right eye and left eye aperture mountings on said frame, polarized filter sheets having horizontal and vertical planes of polarization mounted in said right eye and left eye apertures respectively whereby the right eye image is transmitted only by said right polarized filter sheet, and said left eye image is transmitted only by said left eye polarized filter sheet, and whereby the light efficiency of said system is at least doubled, compared to said projector system without said multilayer polarizers and said second reflector.

2. In a motion picture system according to claim 1, first and second aspheric surfaces which are elliptical cylinders adapted to produce a light beam having an elliptical cross section covering said first aperture, the said rays of said light beam being nearly parallel to said axis.

3. In a motion picture system according to claim 1, first and second aspheric surfaces which are elliptical cylinders modified to produce a light beam having an oval cross section, the said rays of said light beam being nearly parallel to said axis whereby said first aperture is covered with minimum spillage of light.

4. A motion picture system according to claim 1, in which said multilayer polarizer sheet comprises a plane sheet of glass on which there is at least one titanium dioxide layer, the Brewster angle being at about 15° to the said axis.

5. A motion picture system according to claim 1, in which said first and second polarizers are high transmission polarizers, whereby the said polarized light rays impinging on said reflecting screen are at least 99.9% polarized.

6. A motion picture system according to claim 1 in which the said polarized filters of the said polarized viewers have planes of polarization which are horizontal and vertical.

7. A motion picture system according to claim 2, and in which a converging light pipe causes substantially the entire beam cross section to enter the gate.

8. A motion picture system according to claim 5, in combination with a light conserving means whereby the light output is increased, by a factor of about 2.6 times.

9. A motion picture system according to claim 1, in which the motion picture system is a 3D-TV system.

* * * * *